H. SCHMIDT.
CYCLE HUB WITH BRAKE MECHANISM.
APPLICATION FILED JAN. 23, 1918.
1,280,558.
Patented Oct. 1, 1918.
2 SHEETS—SHEET 2.
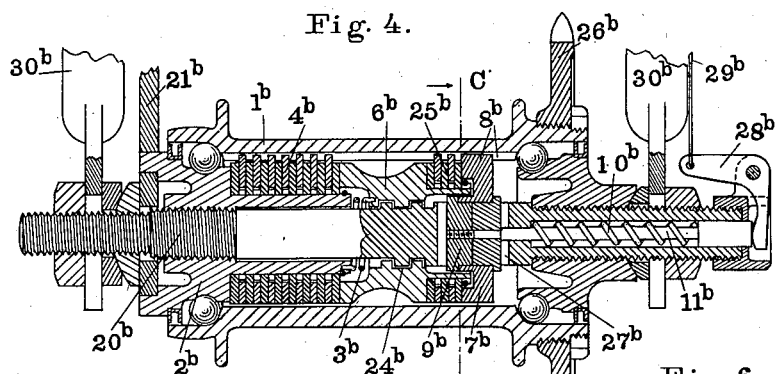
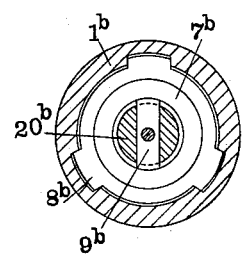
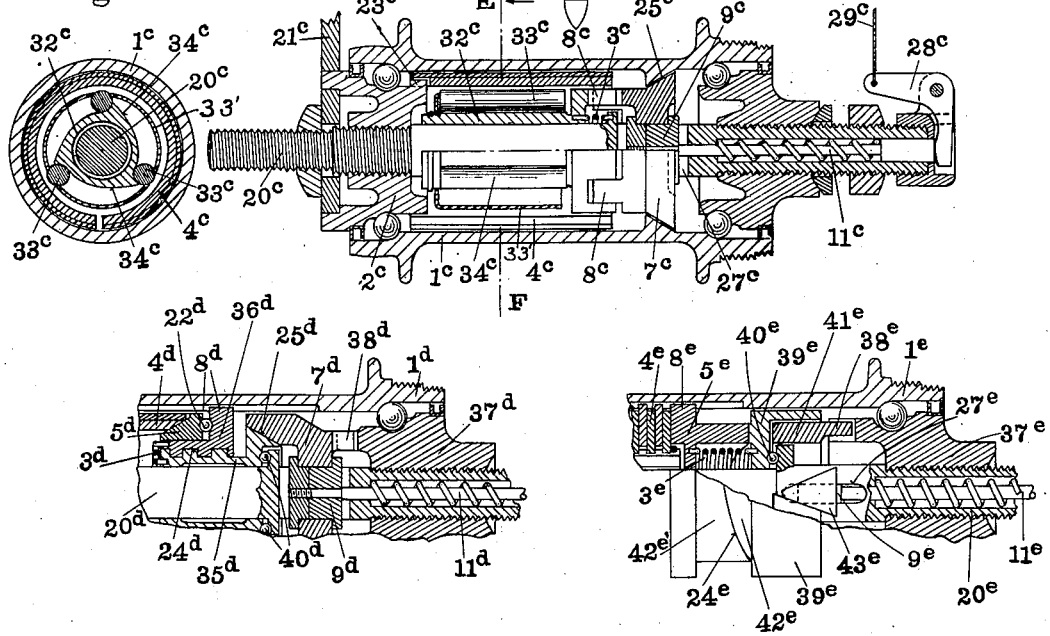
Inventor

UNITED STATES PATENT OFFICE.

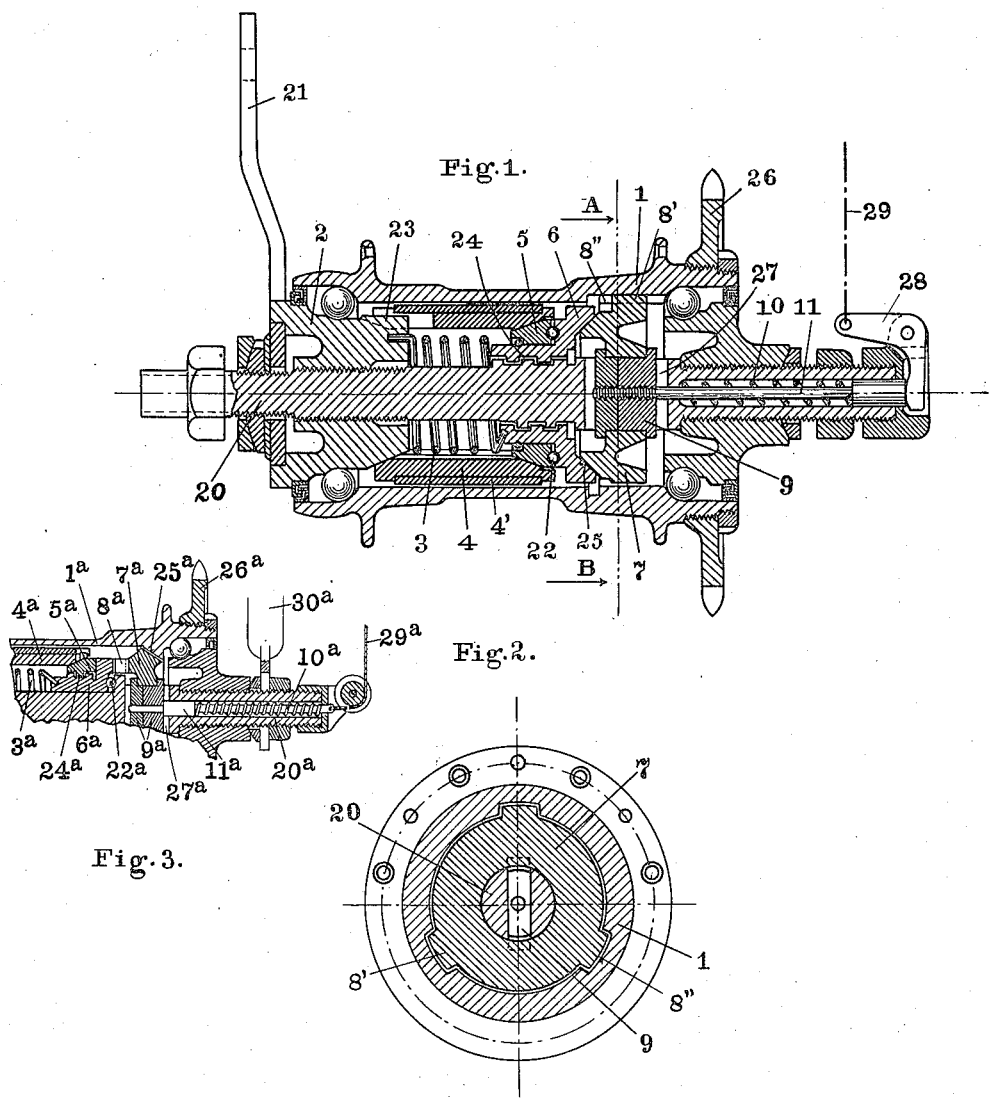

HERMANN SCHMIDT, OF SUHL, GERMANY.

CYCLE-HUB WITH BRAKE MECHANISM.

1,280,558.   Specification of Letters Patent.   Patented Oct. 1, 1918.

Application filed January 23, 1918. Serial No. 213,439.

*To all whom it may concern:*

Be it known that I, HERMANN SCHMIDT, a subject of the King of Prussia, residing at No. 6 Ellerstrasse, of Suhl, in Germany, have invented certain new and useful Improvements in Cycle-Hubs with Brake Mechanism, of which the following is a specification.

The object of the invention is to devise a wheel hub for cycles and the like, which hub is provided with a brake appliance mounted therein and adapted to be applied by the rotating hub itself with the aid of a coupling mechanism which is controlled by the driver. The invention more particularly relates to the brake applying means together with the said coupling device and its connection and coöperation with the hub and the brake proper.

The object of the invention is attained by the provision of means so constructed as to apply the brake, when operated; a positive or rigid clutch which will, however, permit of a relative axial displacement or expansion of the united members; a friction coupling capable of a variable engagement, the working clutch faces of which slide upon each other after the application of the brake has taken place; and means for controlling the couplings by the driver of the cycle, said means being for this purpose connected with power transmitting members which are conducted to the reach of the driver.

The combination benefits by the "*vis viva*" of the cycle for the application of the brake, instead of its direct operation by back pedaling, the sliding clutch, being an additional brake. The control of the braking devices requires little power, while it allows of varying the action of the brake instantaneously.

Other objects will appear from the description, the respective constructions being represented in the drawing and ascertained in the claims.

In the drawing which forms a part of this specification, several embodiments of the invention are illustrated.

Figure 1 represents a longitudinal section and

Fig. 2 a cross-section on the line A—B in Fig. 1, of a cycle hub performed according to the invention.

Fig. 3 is a partial sectional view of a modified construction of the coupling and brake applying mechanism on a smaller scale.

Figs. 4 and 5 are, respectively, a longitudinal sectional view and a cross-section on the line C—D of another construction.

Figs. 6 and 7 represent a further modification and illustrate, respectively, a longitudinal section thereof and a cross-section on the line E—F of Fig. 6.

Figs. 8 and 9 show longitudinal sectional views of two further modifications of the construction.

Similar numerals designate similar parts throughout all figures of the drawing.

Referring to Figs. 1 and 2, the brake consists of an expansible brake sleeve or band made of two parts 4 and 4' secured within one another, and two brake-expanding members 2 and 6, the first of which is conical and fixed upon the axle 20 and can be connected non-rotatably to the cycle frame by means of the usual arm 21, while the axle 20 is secured in the rear fork of the cycle in the ordinary way, as illustrated at $30^a$ and $30^b$ in Figs. 3 and 4, respectively. The movable expanding body 6 is preferably provided with a loose expanding cone 5, freely rotatable on the body 6, for which purpose there is arranged a ball-bearing 22 between the two members 5 and 6. Obviously it may also be possible to make the two parts 5 and 6 of one piece and to arrange, if necessary, an anti-friction device of known construction between the cone 5 and the brake 4. The brake sleeve 4 which is longitudinally split to permit of its expansion is mounted non-rotatably but movably in the longitudinal direction by means of a longitudinal slot provided in it, a boss 23 projecting from the expanding body 2 and engaging into said slot. Upon the axle 20 there is provided a screw thread 24 with which engages by a corresponding female thread the movable expanding member 6. If said member is turned in the direction of the forward rotation of the wheel, it will be screwed upon the thread 24 to the left, that is, into the brake toward the stationary body 2, whereby the sleeves 4 and 4' are expanded from both ends by means of the expanding bodies 2 and 5, and forced outwardly against the inner face of the hub 1. Screwing back of the body 6 is effected by a helical spring 3, which engages with its ends into holes of the stationary body 2 and the movable body 6, respectively, and is put under tension during the application of the brake, the position of rest of the spring corresponding to the position assumed by the various parts, when the brake is released.

The application of the brake can be effected by the aid of a coupling member 7, which is connected to the hub 1 by means of longitudinal grooves 8'' formed in the inner face of the hub, and feathers 8' projecting from the member 7 into said grooves, and a friction coupling which is formed between the coupling member 7 and the expanding body 6, for example, a cone clutch coupling 25 adapted to be thrown into and out of gear by the driver. The coupling member 7 is rotatable upon the axle 20 and adapted to be moved axially thereon by means of a guide slide 9 engaging the hub of the member 7 and being displaceable in a slot 27 of the axle 20, through a control rod 11 attached to the slide 9 and located in a bore of the axle. A spring 10 is acting upon the rod 11 in one direction, tending to push it to the right in Fig. 1. The control device may be constructed in any known manner and operated manually or by foot. In Fig. 1 the one arm of a bell crank lever 28 bears against the outer extremity of the rod 11, while to the other arm a cord or the like may be attached which is pulled by the driver, when the brake is to be applied. Then the rod 11 and the slide 9 will be displaced to the left through the lever 28, and the member 7 will be carried in the same direction, so that the friction clutch faces 25 are brought to engagement. The member 7 which rotates with the hub will now also rotate the member 6 and screw it upon the thread 24 to the left, whereby the brake 4 and 4' is expanded, as described here above. When the brake has been fully applied, no further rotation of the body 6 will be possible; therefore the coupling faces 25 of the members 6 and 7 are caused to slide upon one another, thus contributing to the braking action. The brake 4 and 4' is pressed against the hub with a force which is the greater the greater the pressure by which the clutch 25 is held closed. This enables the brake action to be regulated as desired by the driver.

Referring to Fig. 3 in which the couplings 7 and 8 shown in Fig. 1 are interchanged, left-handed screw threads $24^a$ are disposed on and between the expanding cone $5^a$ and sleeve $6^a$ which latter is loose on the axle $20^a$ and supported by a thrust ball bearing $22^a$. An axially expansible claw coupling $8^a$ is provided between the sleeve $6^a$ and the member $7^a$, while a friction coupling $25^a$ is disposed to connect the member $7^a$ to the hub $1^a$ at will. When by pulling on the cord $29^a$ the friction coupling $25^a$ is thrown in, the forward rotation of the member $6^a$ in unison with the hub causes the cone $5^a$ to be screwed to the left, thus applying the brake $4^a$, as hereinbefore described.

In the modification represented in Figs. 4 and 5 an axially displaceable coupling $8^b$ has a feathered connection with the hub $1^b$, its connection with the sleeve $6^b$ being effected by means of a multiple disk clutch $25^b$, when the brake is to be applied. The rotating hub will then screw the said sleeve $6^b$ on the right-handed screw threads $24^b$ toward the disk brake $4^b$. On releasing the controlling appliance $28^b$, $11^b$, $9^b$ and uncoupling the sleeve $6^b$, the latter will be moved back to the right by a spring $3^b$.

In Figs. 6 and 7 the conical friction coupling $25^c$ is again disposed to connect the hub $1^c$ with the member $7^c$ which is joined to the sleeve $32^c$ through the expansible claw coupling $8^c$. Application of the brake sleeve $4^c$ is attained with the use of expansion rollers $33^c$ circumferentially movable in eccentric pockets $34^c$ upon the periphery of the sleeve $32^c$ (Fig. 7). $33'$ is a cage or spacing-ring for the rollers. For turning back of the sleeve $32^c$ a spiral spring $3^c$ is provided.

In lieu of connecting to the hub a brake operating appliance which is normally at rest, as shown in Figs. 1 and 3, such appliance may be positively coupled to the hub by an axially displaceable clutch and permanently rotating therewith, the friction coupling serving to keep stationary a member of the brake operating device. Two constructions of this kind are illustrated in Figs. 8 and 9 in partial sectional views.

In Fig. 8 the coupling member $7^d$ is joined with the stationary bearing cone $37^d$ by the claw clutch $38^d$ which allows the member $7^d$ to be shifted upon the axle $20^d$ through the control rod $11^d$ and the slide $9^d$, while a bevel coupling $25^d$ is arranged between said member and a flanged sleeve $35^d$ which can normally freely rotate upon the axle $20^d$ and is supported by a thrust bearing $40^d$ on a collar of the said axle. Upon the periphery of said sleeve are provided screw threads $24^d$ engaged by corresponding female screw threads of a brake applying member $36^d$ rotatably mounted within an expanding cone $5^d$ which is attached to the brake sleeve $4^d$. A spiral spring $3^d$ the extremities of which grip into the members $35^d$ and $36^d$ serves to restore the normal relative position of the said members after releasing of the brake. Longitudinal grooves in the inner face of the hub $1^d$ and feathers $8^d$ projecting from the member $36^d$ form a positive connection through which the brake applying device is driven by the hub.

Fig. 9 represents the use of an expansible split ring or band $41^e$ as the friction coupling, said band being joined to the stationary cone 37ᵉ by means of a groove and feather connection 38ᵉ and located within the circular depression of a cup-shaped body 39ᵉ which is mounted rotatably upon the axle 20ᵉ. When the controlling rod 11ᵉ is pushed to the left, a wedge 43ᵉ connected therewith will be driven between the extremities of the band 41ᵉ and expand the band, pressing it on to the inner face of the body 39ᵉ which will then be immobilized. Teeth or claws 42ᵉ projecting from the left side of the body 39ᵉ are in engagement with corresponding teeth 42ᵉ' formed oppositely upon a ring 5ᵉ which is joined with the hub 1ᵉ through the coupling 8ᵉ and adapted to operate the multiple disk brake 4ᵉ. The adjacent or contacting back faces 24ᵉ of the teeth 41ᵉ and 42ᵉ are helically curved, so that the forward rotation of the ring 5ᵉ relatively to the fixed body 39ᵉ will cause the former to move to the left, thereby applying the brake.

It can easily be understood that in all constructions heretofore described the friction coupling, when connected, will induce the application of the brake, as the hub carries with it in its rotation certain parts of the brake applying appliance, thus causing a relative movement of the rotating and fixed parts, but that the friction coupling will be overcome and brought to slide, as soon as the brake has been fully applied. Since it is possible to connect the friction coupling with variable power, the brake, of course, can be operated to any degree which is found convenient at the time being. At all events the friction coupling acts as a brake the operation of which is added to that of the brake proper.

From the foregoing description with reference to the various constructions shown in the drawing it may be seen that the embodiment of the invention can be performed in different ways without departing from its principle.

What I, therefore, claim as my invention, and desire to secure by Letters Patent, is—

1. In a brake for cycles, the combination with a wheel hub, of a brake mounted therein, brake applying means, and couplings interconnecting the said means with the hub in such a manner that the brake can be applied by the rotating hub.

2. In a brake for cycles, the combination with a wheel hub, of a brake mounted therein, and brake applying means which are interconnected with, and operated by the said hub.

3. In a brake for cycles, the combination with a wheel hub, of a brake mounted therein, means for applying the brake, said means being interconnected with, and operated by the hub, and a friction coupling adapted to be controlled by the driver.

4. In a brake for cycles, the combination with a wheel hub, of a brake mounted therein and means for applying the brake, said means being provided with a coupling permitting of relative axial displacement of the joined members and a friction coupling capable of being brought to engagement with variable power.

5. In a brake for cycles, the combination with a wheel hub, of a brake and brake applying means mounted in said hub, and coupling means capable of frictional engagement and axial displacement, said coupling means being adapted to interconnect the hub with the brake applying means in such a manner that the brake can be applied by the rotating hub.

6. In a brake for cycles, the combination with a wheel hub, of a brake and brake applying means mounted in said hub, means for interconnecting the hub with the brake applying means in such a manner that the brake can be applied by the rotating hub, and means allowing the control of the brake applying means by the driver.

7. In a brake for cycles, the combination with a wheel hub, of a brake and brake applying means mounted therein, coupling means adapted to interconnect the brake applying means to the said hub, and controlling means capable of engaging the said coupling means.

8. In a brake for cycles, the combination with a wheel hub, of a brake and brake applying means mounted therein, coupling means capable of frictional engagement and axial displacement and adapted to interconnect the hub with the brake applying means, and means permitting the control of the brake applying means by the driver.

9. In a brake for cycles, the combination with a wheel hub, of a brake and brake applying means mounted therein, an axially displaceable coupling member, a friction coupling arranged between the brake applying means and said member, a positive coupling between the hub and said member, and controlling means adapted to be operated by the driver and to shift the said coupling member.

10. In a brake for cycles, the combination with a wheel hub, of a wheel axle having a hollow portion, a brake mounted in said hub, brake applying means engaged with the axle through screw threads, a coupling member mounted displaceable upon the axle, a friction coupling arranged between said member and the brake applying means, an axial expansible coupling disposed between the hub and the coupling member, controlling means located in the hollow portion of the axle and permitting of the displacement of said coupling member by the driver, and a spring adapted to return the brake applying means to its inoperative position.

11. The combination, with a wheel-hub, of an expansible brake carried therewithin and frictionally engageable with said hub, and means for expanding said brake, comprising a rectilinearly-movable brake-expanding member, and a clutch-member coupled to and rotating with said hub and frictionally engageable with said brake-expanding member.

12. The combination, with a wheel-hub and axle, of an expansible brake carried within said hub and frictionally engageable with said hub, and means for expanding said brake, comprising a member having a threaded engagement with said axle and movable longitudinally thereon, and a clutch-member coupled to and rotating with said hub and frictionally engageable with said member threaded on the axle.

In testimony whereof I have signed my name to this specification in the presence of two subscribing witnesses.

HERMANN SCHMIDT.

Witnesses:
 OSCAR SCHÜLER,
 RICHARD RADKIN.